(12) United States Patent
Laufer et al.

(10) Patent No.: US 8,802,809 B2
(45) Date of Patent: Aug. 12, 2014

(54) METHOD OF PRODUCTION OF CAST POLYAMIDES

(75) Inventors: Wilhelm Laufer, Ellerstadt (DE); Armin Eckert, Oberhausen-Rheinhausen (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 13/283,155

(22) Filed: Oct. 27, 2011

(65) Prior Publication Data

US 2012/0245320 A1    Sep. 27, 2012

(30) Foreign Application Priority Data

Oct. 29, 2010   (EP) ..................................... 10189435

(51) Int. Cl.
| | | |
|---|---|---|
| *C08G 69/16* | (2006.01) | |
| *C08G 69/20* | (2006.01) | |
| *B29C 67/24* | (2006.01) | |
| *C08G 69/18* | (2006.01) | |
| *B29K 77/00* | (2006.01) | |

(52) U.S. Cl.
CPC .............. *B29C 67/246* (2013.01); *C08G 69/20* (2013.01); *B29K 2077/00* (2013.01); *C08G 69/18* (2013.01); *C08G 69/16* (2013.01)
USPC ........... 528/323; 528/310; 528/314; 528/325; 528/326

(58) Field of Classification Search
USPC ........................... 528/310, 314, 323, 325, 326
See application file for complete search history.

(56) References Cited

U.S. PATENT DOCUMENTS

| | | | |
|---|---|---|---|
| 2,840,589 A | 6/1958 | Smeltz | |
| 3,752,623 A | 8/1973 | Sinn et al. | |
| 4,160,080 A | 7/1979 | Koenig et al. | |
| 7,067,654 B2 | 6/2006 | Richter et al. | |
| 8,354,492 B2 * | 1/2013 | Kray et al. | ..................... 528/323 |
| 2006/0194941 A1 * | 8/2006 | Van Geenen et al. | .......... 528/323 |
| 2009/0306332 A1 * | 12/2009 | Kray et al. | ..................... 528/323 |
| 2012/0088899 A1 | 4/2012 | Scherzer et al. | |

FOREIGN PATENT DOCUMENTS

| | | |
|---|---|---|
| DE | 1130594 B | 5/1962 |
| DE | 1942992 A1 | 5/1970 |
| DE | 2122573 A1 | 11/1972 |
| DE | 2559749 A1 | 9/1977 |
| EP | 0408957 A2 | 8/1991 |
| EP | 1975191 A1 | 10/2008 |
| GB | 1364550 | 8/1974 |
| GB | 2286595 A | 8/1995 |

OTHER PUBLICATIONS

European Search Report from co-pending Application EP10189435 dated Apr. 11, 2011, 3 pages.
European Search Report from co-pending Application EP11186586 dated Dec. 29, 2011, 4 pages.
L Brueggemann Kommanditgesellschaft, Brueggemann Chemical, Polymer Additives, Bruggolen C10, Technical Data Sheet, Version Oct. 2007, Heilbronn, Germany, available at http://www.brueggemann.com.
L Brueggemann Kommanditgesellschaft, Brueggemann Chemical, Polymer Additives, Bruggolen C20/C20P, Technical Data Sheet, Version Oct. 2007, Heilbronn, Germany, available at http://www.brueggemann.com.

\* cited by examiner

*Primary Examiner* — Gregory Listvoyb
(74) *Attorney, Agent, or Firm* — Nicanor A. Kohncke

(57) ABSTRACT

The present invention relates to a new method of production of cast polyamides.

5 Claims, No Drawings

METHOD OF PRODUCTION OF CAST POLYAMIDES

The present invention relates to a new method of production of cast polyamides.

Cast polyamides are particularly high-molecular polyamides. In the production of cast polyamides, a lactam is poured into a mould together with at least one catalyst and at least one activator and then polymerized anionically in this mould. The starting compounds present in the mould are generally polymerized under the action of heat. This results in a homogeneous material, which is superior to extruded polyamides with respect to crystallinity.

Cast polyamides are suitable as thermoplastic polymers for the manufacture of complex components. In contrast to many other thermoplastics, they do not need to be melted, but are formed by pressureless anionic polymerization of a lactam in a mould at 120 to 150° C. in just a few minutes. All known casting processes can be used, such as gravity casting, rotational casting and centrifugal casting. In each case the end product obtained comprises mouldings of a high-molecular, crystalline polyamide, which is characterized by low weight, high mechanical strength, very good sliding properties and excellent resistance to chemicals, and—because mould filling does not take place under pressure—has only small internal stresses. Cast polyamides can be sawn, drilled, milled, ground, welded and printed or painted; as well as complex hollow shapes, it is also possible for example to use this polymer for making rollers for passenger lifts and semifinished products, for example tubes, rods and plates for machine construction and for the automobile industry.

The production of cast polyamide parts starting from low-viscosity lactam melts and a catalyst and an activator by so-called activated anionic polymerization is known per se. For this purpose, usually two mixtures of catalyst and lactam or activator and lactam are prepared fresh in the form of a liquid melt separately from one another before polymerization, are mixed together immediately and then polymerized in the mould. This should ensure that no undesirable reaction occurs beforehand.

As the catalysts/activators are only required in small amounts, proportioning is difficult. Inaccurate proportioning leads to large fluctuations in product quality and therefore to defective batches. Moreover, the activator/catalyst suffers when it comes repeatedly into contact with air and moisture. Therefore it is also desirable from the standpoint of workplace hygiene to prepare the activator and/or catalyst in a different, safer manner.

One problem to be solved by the present invention is therefore to provide a cost-effective and efficient method, which does not have the disadvantages of the prior art.

It has now been found, surprisingly, that mixtures of at least one activator in at least one lactam and optionally at least one catalyst in at least one lactam, while complying with certain concentration limits, can in fact be produced, isolated and stored, and more easily, and can be used as so-called BATCH-READY® lactam in the concentrations desired for polymerization. This high constancy of quality of the Batch-Ready® products can be attributed to the extremely precise initial weights of the individual constituents and the subsequent facilitated proportioning of the homogenized mixture. The proportioning measures for very small amounts, which are critical for the criteria of quality and labour safety, therefore no longer apply.

The present invention therefore relates to a new method of production of cast polyamides by polymerization of lactams in the presence of at least one activator and at least one catalyst, according to which a) the activator is added in an amount of a max. 5 wt %, preferably max. 2 wt %, especially preferably 0.1 wt % up to less than 1 wt % mixture in at least one lactam melt at temperatures between 70 and 120° C., preferably 80-100° C., homogenized and isolated after production, optionally dried, packed and stored, or pelletized on a pelletizing belt or flaked on a flaking roll and b) the catalyst is added in an amount of a max. 5 wt %, preferably 0.2 wt % of to less than 2 wt %, especially preferably 1 wt % up to less than 2 wt % in at least one lactam melt at temperatures between 70 and 120° C., preferably 80-100° C., homogenized and pelletized on a pelletizing belt or flaked on a flaking roll, these melts of, a) and b) are mixed together and then are polymerized in the mould at temperatures between 80 and 160° C.

In one embodiment of the invention the activator is added in an amount of a max. 5 wt %, preferably max. 2 wt %, especially preferably 0.1 wt % up to less than 1 wt % mixture in at least one lactam melt at temperatures between 70 and 120° C., preferably 80-100° C., homogenized and isolated after production, dried, packed and stored In another embodiment of the invention the activator is added in an amount of a max. 5 wt %, preferably max. 2 wt %, especially preferably 0.1 wt % up to less than 1 wt % mixture in at least one lactam melt at temperatures between 70 and 120° C., preferably 80-100° C., homogenized and isolated after production, packed and stored.

Compounds of general formula (I)

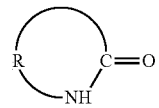

can be used as lactam in the sense of the invention, where R represents an alkylene group with 3 to 13 carbon atoms. Preferably it is caprolactam and/or laurolactam. These are available commercially, e.g. from the company Lanxess Deutschland GmbH.

Isocyanates, isocyanurates, biurets, allophanates, uretdiones and/or carbodiimides, as the individual compound or as a mixture, can be used as activators in the sense of the invention. Activators that are blocked e.g. with lactams, especially preferably caprolactam, or with phenols, oximes and/or epoxides and/or also activators containing solvents, can also be used in the sense of the invention. The following are suitable as solvents: N-alkylpyrrolidones, e.g. N-methylpyrrolidone and N-ethylpyrrolidone, polyglycols such as polyglycol DME 200, dipropylene glycol DME or tetraethylene glycol DME. These are commercially available products, which are obtainable for example from the company Clariant.

Isocyanates in the sense of the invention are e.g. diisocyanates, such as 2,4-tolylene diisocyanate (TDI), 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, 1,5-naphthalene diisocyanate, 4,4'-diphenylmethane diisocyanate, 2,4'-diphenylmethane diisocyanate, 2,2'-diphenylmethane diisocyanate, 4,4'-diphenyldimethylmethane diisocyanate, 1,3-phenylene diisocyanate, 1,4-phenylene diisocyanate, dicyclohexylmethane-4,4'-diisocyanate, dicyclohexylmethane-2,4'-diisocyanate, dicyclohexylmethane-2,2'-diisocyanate, methylcyclohexane diisocyanate, tetramethylxylylene diisocyanate, 2,6-diisopropylphenylene isocyanate and mixtures thereof. Hexamethylene diisocyanate is especially preferred. The aforementioned compounds are commercially available and are obtainable for example from the company Bayer MaterialScience AG.

Isocyanurates in the sense of the invention are compounds of formula (II)

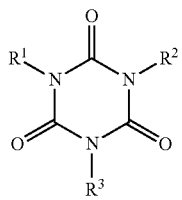

where $R^1$, $R^2$ and $R^3$ in each case independently of one another are $-(CH_2)_m-N=C=O$, $-(CH_2)_q-[(C_6H_3)(Me/Et)_3(N=C=O)]$, and m=1-12, q=0-6 and Me=methyl and Et=ethyl, wherein
$R^1$, $R^2$ and $R^3$ are preferably identical.

The following compounds of formula (III)

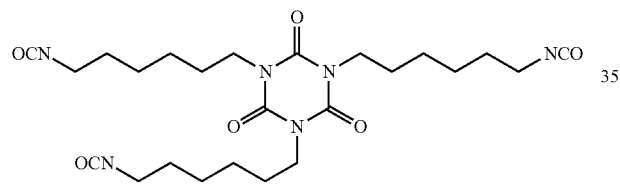

and of formula (IV)

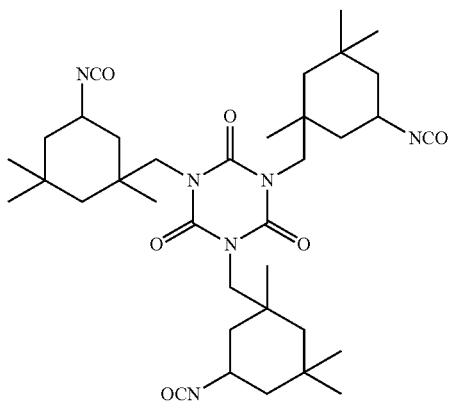

are preferred.

The aforementioned compounds are commercially available and are obtainable for example from the company Bayer MaterialScience AG.

Biurets in the sense of the invention are for example compounds of formula (V)

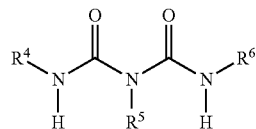

where $R^4$, $R^5$ and $R^6$ in each case independently of one another are $-(CH_2)_p-N=C=O$, with p=1-12, wherein $R^4$, $R^5$ and $R^6$ are preferably identical.

In an especially preferred embodiment of the invention the biuret is a compound of formula (VI)

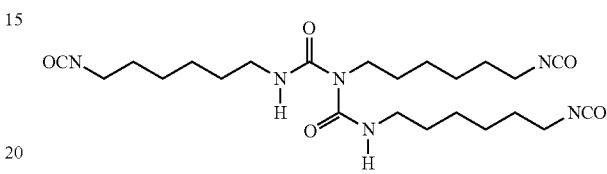

The aforementioned compounds are commercially available and are obtainable for example from the company Bayer MaterialScience AG.

Uretdiones in the sense of the invention are reaction products of at least two isocyanates with formation of at least two dioxodiazetidine bonds:

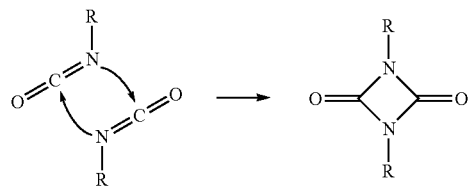

Their preparation is known per se by a person skilled in the art and can for example be carried out as described in EP 1 422 223 A1.

The uretdione can be a dimer, trimer, oligomer or polymer.

Suitable examples of uretdiones, which have an aliphatic or cycloaliphatic radical, are known per se by a person skilled in the art and corresponding monomeric uretdiones comprise for example isophorone diisocyanate, 1,4-cyclohexyl diisocyanate, 1,1-methylene-bis(4-isocyanatocyclohexane), 1,2-bis(4-isocyanatononyl)-3-heptyl-4-pentyl-cyclohexane and hexamethylene-1,6-diisocyanate. The use of isophorone diisocyanate and hexamethylene-1,6-diisocyanate is preferred.

Furthermore, it is possible within the scope of the present invention to use, as activator, a uretdione that is obtained starting from an aromatic isocyanate. This aromatic isocyanate preferably has 6 to 20 carbon atoms, especially preferably 6 to 15 carbon atoms. Corresponding aromatic monomeric isocyanates can for example be selected from the group comprising 2,4-diisocyanatotoluene, 2,6-diisocyanatotoluene, 1,5-naphthylene diisocyanate, 4,4'-methylene-diphenyl diisocyanate, 1,3-bis(3-isocyanato-4-methylphenyl)-2,4-dioxodiazetidine, N,N'-bis(4-methyl-3-isocyanatophenyl)urea and tetramethylxylylene diisocyanate. Among these aromatic isocyanates, 2,4-diisocyanatotoluene, 2,6-diisocyanatotoluene and 4,4'-methylene-bis(phenyl diisocyanate) are preferred. 2,6-Diisocyanatotoluene and 4,4'-methylene-bis(phenyl diisocyanate) are especially preferred.

The aforementioned compounds are commercially available and are obtainable for example from the company Rhein Chemie Rheinau GmbH or from Bayer MaterialScience AG.

Allophanates in the sense of the invention are compounds of formula (VII)

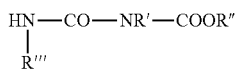

These compounds are generally obtainable by reacting any starting compounds containing urethane and/or urea groups, also containing units of the general formula (R″OOC—NHR′), with monoisocyanates of the general formula R‴—NCO or with diisocyanates of the general formula OCN-A-NCO, where R‴ or A is preferably an alkyl radical with 1 to 20 carbon atoms or an aryl radical with 6 to 20 carbon atoms and R′ and R″, independently of one another, are an alkyl radical with 1 to 20 carbon atoms or an aryl radical with 6 to 20 carbon atoms.

Suitable monoisocyanates are any aromatic, aliphatic and cycloaliphatic monoisocyanates with up to 20 carbon atoms, such as methylisocyanate, isopropylisocyanate, n-butylisocyanate, n-hexylisocyanate, cyclohexylisocyanate, stearylisocyanate, the optionally halogenated phenylisocyanates, 1-naphthylisocyanate, the optionally chlorinated or fluorinated m-, o-, and p-tolylisocyanates, p-isopropylphenylisocyanate, 2,6-diisopropylphenylisocyanate and p-toluenesulphonyl diisocyanate.

Suitable diisocyanates are any aromatic, aliphatic and cycloaliphatic diisocyanates with 6 to 40 carbon atoms, preferably 6 to 15 carbon atoms, such as isophorone diisocyanate, 1,4-cyclohexyl diisocyanate, 1,1-methylene-bis(isocyanatohexane), 1,2-bis(4-isocyanatononyl)-3-heptyl-4-pentylcyclohexane, hexamethylene-1,6-diisocyanate, 2,4-diisocyanatotoluene, 2,6-diisocyanatotoluene, 1,5-naphthylene diisocyanate, 4,4′-methylenediphenyl diisocyanate, 1,3-bis(3-isocyanato-4-methylphenyl)-2,4-dioxodiazetidine, N,N′-bis(4-methyl-3-isocyanatophenyl)urea and tetramethylxylylene diisocyanate. Of these, hexamethylene-1,6-diisocyanate is preferred.

The allophanates that are especially preferred within the scope of the present invention are compounds of formula (VIII)

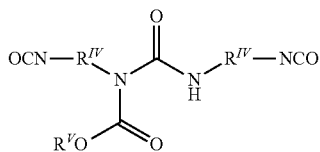

where $R^{IV}$ within the molecule can be identical or different and denote $C_1$-$C_6$-alkyl, preferably —$(CH_2)_6$—, and $R^V$ corresponds to $C_1$-$C_6$-alkyl.

Corresponding allophanates and production thereof are described for example in EP 0 000 194 A1, whose disclosure in this respect is incorporated by reference in the present invention. The aforementioned compounds are commercially available and are obtainable for example from the company Bayer MaterialScience AG.

Carbodiimides in the sense of the invention are preferably compounds of formula (IX)

$$R^{11}\text{—}(\text{—N}\!\!=\!\!\text{C}\!\!=\!\!\text{N—}R^{12}\text{—})_m\text{—}R^{13} \qquad (IX),$$

in which
m corresponds to an integer from 1 to 500,
$R^{12}$=$C_1$-$C_{18}$-alkylene, $C_5$-$C_{18}$-cycloalkylene, arylene and/or $C_7$-$C_{18}$-aralkylene,
$R^{11}$=$R^{12}$—NCO, $R^{12}$—NHCONHR$^9$, $R^{12}$—NHCONR$^9$R$^7$ or $R^{12}$—NHCOOR$^8$ and
$R^{13}$=—NCO, —NHCONHR$^9$, —NHCONR$^9$R$^7$ or —NHCOOR$^8$,
where, in $R^{11}$, $R^9$ and $R^7$, independently of one another, are identical or different and represent a $C_1$-$C_6$-alkyl, $C_6$-$C_{10}$-cycloalkyl or $C_7$-$C_{18}$-aralkyl radical and $R^8$ represents a $C_1$-$C_6$-alkyl-, $C_6$-$C_{10}$ cycloalkyl- or $C_7$-$C_{18}$-aralkyl radical or denotes a polyester or polyamide radical or —$(CH_2)_l$—(O—$(CH_2)_k$—O)$_g$—$R^{10}$,
with l=1-3, k=1-3, g=0-12 and
$R^{10}$=H or $C_1$-$C_4$-alkyl.

Mixtures of carbodiimides of formula (IX), including the corresponding oligomers and/or polymers, can also be used, polymeric carbodiimides being preferred.

The compounds according to formula (IX) are commercially available, e.g. from the company Rhein Chemie Rheinau GmbH or can be prepared by the methods that are familiar to a person skilled in the art, as described for example in DE-A-11 30 594 or U.S. Pat. No. 2,840,589 or by the condensation of diisocyanates with cleavage of carbon dioxide at elevated temperatures, e.g. at 40° C. to 200° C., in the presence of catalysts. Strong bases or phosphorus compounds, for example, have proved suitable as catalysts. Phospholene oxides, phospholidines or phospholine oxides and the corresponding sulphides are preferably used. Tertiary amines, metal compounds with a basic reaction, metal salts of carboxylic acids and non-basic organometallic compounds can also be used as catalysts.

The aforementioned compounds are commercially available and are obtainable for example from the company Rhein Chemie Rheinau GmbH.

Blocked activators, preferably with lactams, especially preferably caprolactam, or activators blocked with phenols, oximes and/or epoxides can for example be produced by reaction of at least one compound of formulae (I) to (IX) with at least one lactam, caprolactam, phenols, oxime and/or epoxide at temperatures from 80 to 100° C. by the methods familiar to a person skilled in the art.

Lactam-magnesium halides, preferably bromides, alkali-alumo dilactamates, preferably sodium, alkali-metal and/or alkaline-earth-metal lactamates, preferably sodium, potassium and/or magnesium, individually or mixed, can be used as catalysts in the sense of the invention.

The aforementioned catalysts are commercially available and are obtainable for example from the company Rhein Chemie Rheinau GmbH or from the company KatChem spol.s.r.o.

In one embodiment of the invention, mixture a) and mixture b) are added together for polymerization at temperatures between 80 and 160° C., preferably 100 and 140° C. Polymerization takes place by the processes that are familiar to a person skilled in the art, as described for example in Kunststoffbandbuch, Vol. 3/4, Technische Thermoplaste, Hanser Fachbuch, pages 413-430. During this, the mixture is preferably stirred. Mixing units, e.g. stirred reactors, can be used for this.

In another embodiment of the invention, further lactam and/or further catalyst and/or optionally further additives, such as impact modifiers, such as e.g. polyetheramine copolymers, glass fibres, continuous glass fibres, carbon fibres, aramid fibres and/or processing aids, such as e.g. high-molecular polyols, thickeners, such as e.g. aerosils, UV- and thermostabilizers, conductivity improvers, such as e.g. carbon blacks and graphites, ionic liquids, marking substances and/or colorants, are added to mixture a) and mixture b).

Mixtures a) and b) are preferably used in proportions from 1:3 to 3:1, especially preferably in proportions of 1:1.

Production of mixtures a) and b) according to the invention preferably takes place as follows:

a) Activator Mixture

For this, at least one activator of formulae I-IX is added to a lactam melt at temperatures between 70 and 120° C., preferably 80-100° C., homogenized or pelletized on a pelletizing belt or flaked on a flaking roll.

b) Catalyst Mixture

For this, at least one catalyst, e.g. Na caprolactamate or a highly concentrated Na caprolactamate masterbatch, is added to a lactam melt at temperatures between 70 and 120° C., preferably 80-100° C., homogenized or pelletized on a pelletizing belt or flaked on a flaking roll.

The aforementioned pelletizing belts or flaking roll are commercially available from the Sandvik Holding GmbH or GMF Gouda.

As an alternative, catalyst mixture b) can be prepared in concentrations up to max. 5 wt % from the respective starting materials in lactam by direct synthesis, for example as in the methods familiar to a person skilled in the art from lactam and Na methanolate with subsequent or simultaneous removal of the solvent by distillation. The method can be carried out in batch mode and in continuous mode.

In one embodiment of the present invention, mixtures a) and b) are isolated after production, optionally dried, packed and stored. The packed material can be pulverized or crushed. The mixtures of lactam and activator and/or catalyst prepared by the method according to the invention are characterized by high storage stability (for more than 6 weeks), so that the mixtures can be stored prior to use and can be transported to the place of use. It is thus possible to prepare the mixture precisely for use and thus avoid fluctuations in composition that arise in mixtures prepared immediately before polymerization.

The present invention also relates to mixtures that are stable in storage, comprising at least one activator in a concentration up to max. 5 wt % in at least one lactam and use thereof for the production of cast polyamides.

Activators in the sense of the invention are isocyanates, isocyanurates, biurets, allophanates, uretdiones and/or carbodiimides as the individual compound or as a mixture and blocked activators and/or activators also containing solvents, especially preferably biuret and/or isocyanate.

Regarding the mixtures according to the invention that are stable in storage, reference should be made to the above information about the activator.

The present invention also relates to mixtures that are stable in storage, of at least one catalyst that is solid at temperatures up to 80° C., in a concentration up to max. 5 wt % and a lactam and use thereof for the production of cast polyamides.

The invention also covers the use of a combination of the aforementioned mixture according to the invention that is stable in storage, of at least one activator and at least one solid catalyst mixture that is stable in storage at temperatures of up to 80° C., for use in the production of cast polyamides.

Catalysts in the sense of the invention are lactam-magnesium halide, alkali-alumo dilactamate, alkali-metal and/or alkaline-earth-metal lactamate.

Regarding the mixtures according to the invention that are stable in storage, reference should be made to the above information about the catalyst.

The aforementioned mixtures according to the invention are preferably used as a substitute for metal, e.g. in the automobile industry, in the production of electrical engineering components and for electronic purposes, for the production of plates, rods, tubes, sheaves, pulleys, gear wheels and bearings and/or for container manufacture.

Regarding the mixtures according to the invention that are stable in storage, reference should be made to the above information about lactam. Compounds of formula (I) are preferred.

The scope of the invention encompasses all of the definitions of radicals, indices, parameters and explanations stated generally or in preferred ranges above and in the following taken together, thus also between the respective ranges and preferred ranges in any combination.

In cases when the concentration of active substance in the mixture is above the concentration of active substance intended for polymerization, further lactam can be added before the actual polymerization.

In cases when only the activator is used as mixture with the lactam, preferably the catalyst, optionally together with further lactam, is added to the activator mixture during polymerization.

The following examples serve for explaining the invention, but without limiting it.

EXAMPLES

Reagents:

Caprolactam dry (MP>69° C.) from the company Lanxess Germany GmbH,

Activator Addonyl® 8108, a hexamethylene diisocyanate (HDI) biuret, 70% in N-ethylpyrrolidone, commercially available from Rhein Chemie Rheinau GmbH, Activator Brüggolen C20 (approx. 35% HDI in caprolactam), commercially available from the company Brüggemann GmbH, Addonyl® Kat NL from Rhein Chemie Rheinau GmbH, approx. 18% sodium caprolactamate in caprolactam.

Execution and Measurement:

Flask A: 196.8 g caprolactam and 3.2 g Addonyl® 8108, equivalent to 2.2 g HDI biuret (comparative example), prepared immediately before measurement, Flask B: 192 g caprolactam and 8 g 18% Na caprolactamate in caprolactam as Addonyl® Kat NL (comparative example), prepared immediately before measurement, Flask C: 197.8 g caprolactam and 2.2 g HDI biuret (according to the invention), stored at 90° C. for a period of: a) Flask C1: 1 week, b) Flask C2: 2 weeks, c) Flask C3: 6 weeks.

Flask D: 200 g solid Batch-Ready® caprolactam with an Na caprolactamate content of 0.8% (according to the invention), Flask E: 196.8 g caprolactam and 3.2 g Brüggolen® C20 (comparative example), prepared immediately before measurement, Flask F: 200 g solid Batch-Ready® caprolactam with an HDI-biuret content of 1.2% (according to the invention), Flask G: 200 g solid Batch-Ready® caprolactam with a HDI content of 1.2% (according to the invention), Flasks A to G were heated to 122° C. (±2° C.).

The melts thus obtained were worked up at 122° C. (±2° C.) in an oil bath under vacuum (<15 mbar) for 20 minutes. After aerating with nitrogen, the activator components (Flasks A, C, E, F and G) were combined with the catalyst component (Flasks B and D) as listed in the following table, in a three-necked flask, stirred briefly and transferred to the 600 ml beaker. The temperature of the mould (beaker) was 160° C.

Immediately after bringing the melts together in a three-necked flask, temperature measurement was started. This was carried out using Testo 175-T3 temperature measuring equipment with IR-Serial Interface.

For a period of 15 minutes, the temperature of the polymerizing lactam melt was measured and recorded every 10 seconds.

The curve of the temperature of the polymerization mixture versus time was measured and the time point at which the temperature rise was maximum was determined (turning point on the temperature-time curve). The time from putting the reaction mixtures together up to the time point of the maximum temperature rise corresponds to the pot life.

Table 1 shows the results when using solid Batch-Ready® caprolactam as catalyst mixture and Batch-Ready® caprolactam as activator stored in liquid form (90° C.), mixtures II), III) and IV) compared with the freshly prepared activator/catalyst mixture (mixture I))

TABLE 1

| Examples | Pot life | T (max.) [° C.] |
|---|---|---|
| I) Mixture of A and B (comparative example) | 300-500 s | >190° C. |
| II) Mixture of C1 and D (according to the invention) | 300-500 s | >190° C. |
| III) Mixture of C2 and D (according to the invention) | 300-500 s | >190° C. |
| IV) Mixture of C3 and D (according to the invention) | 300-500 s | >190° C. |

As can be seen from comparison of the examples, storage even for a period of at least 6 weeks does not lead to any impairment of the properties.

Table 2 shows the results for preparation of the solid Batch-Ready activator mixtures compared with the activator mixture Brüggolen C20 from the prior art.

TABLE 2

| Activator | Pelletizability |
|---|---|
| Brüggolen C20 (comparison) | very poor pelletizability |
| 40% HDI biuret in caprolactam (comparison) | not pelletizable |
| Mixture F (according to the invention) | very good pelletizability |
| Mixture G (according to the invention) | very good pelletizability |

Table 3 shows the results when using the solid Batch-Ready caprolactam as activator and catalyst mixture compared with the prior art.

TABLE 3

| Examples | Pot life | T (max.) [° C.] |
|---|---|---|
| Mixture of E and B (comparative example) | 300-500 s | >190° C. |
| Mixture of F and D (according to the invention) | 300-500 s | >190° C. |
| Mixture of G and D (according to the invention) | 300-500 s | >190° C. |

Using the method according to the invention, it is therefore possible for activator and catalyst mixtures to be produced or prepared solvent-free and technically simply, without the need for laborious proportioning of small amounts of catalysts and activators in the process for production of cast polyamide parts. By adjusting the required activator and catalyst proportions specifically and accurately, polymerization can always be carried out optimally, ensuring constant quality of the cast polyamide parts. Moreover, owing to simpler handling of the required raw materials, with personnel costs minimized, the method is more cost-effective and is more advantageous from the standpoint of workplace safety.

What is claimed is:

1. A method of production of cast polyamides comprising:
   adding an activator, in an amount of up to 5 wt %, to a first lactam melt at temperatures between 70 and 120° C., whereby an activator mixture is formed and homogenized, isolated after production, and optionally pelletized on a pelletizing belt or flaked on a flaking roll;
   adding a catalyst in an amount of up to 5 wt % to a second lactam melt at temperatures between 70 and 120° C., whereby a catalyst mixture is formed and homogenized and pelletized on a pelletizing belt or flaked on a flaking roll, and
   subsequently melting and mixing together said activator mixure and said catalyst mixture, thereby forming a melt mixture, and
   polymerized the melt mixture in a mould at temperatures between 80 and 160° C.

2. The method according to claim 1, wherein at least one of the first lactam or the second lactam corresponds to general formula

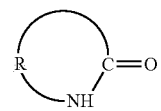

where R represents an alkylene group with 3 to 13 carbon atoms.

3. The method according to claim 1, wherein the activator comprises at least one isocyanate, isocyanurate, biuret, allophanate, uretdione and/or carbodiimid.

4. The method according to claim 1, wherein in catalyst comprises at least one lactam-magnesium halide, alkali-alumo dilactamate, alkali-metal and/or alkaline-earth-metal lactamate.

5. The method according to claim 1, wherein the second lactam and/or catalyst is added prior to melting.

* * * * *